United States Patent Office 3,236,823
Patented Feb. 22, 1966

3,236,823
PROCESS FOR THE POLYMERIZATION OF UNSATURATED COMPOUNDS WITH BORAZANE CATALYSTS
Gert Jennes, Leverkusen, Hubert Sutter, Cologne-Flittard, and Karl Nützel, Leverkusen, Germany, assignors to Farbenfabriken Bayer Aktiengesellschaft, Leverkusen, Germany, a German corporation
No Drawing. Filed Jan. 24, 1961, Ser. No. 84,526
Claims priority, application Germany, Feb. 2, 1960, F 30,438
8 Claims. (Cl. 260—80.5)

This invention relates to a process for the polymerisation of unsaturated organic compounds with the aid of special borazanes.

It is known that boron alkyls of the formula $BR_3$ initiate the radical polymerisation of unsaturated organic compounds. Furthermore, it is known to carry out the polymerisation of unsaturated organic compounds in the presence of borazanes of the general formula $$BH_3 \cdot NR'R''R'''$$

However, boron alkyls can only be handled if special precautionary measures are taken, because they ignite spontaneously in air. On the other hand the aforementioned N-trialkylborazanes are very stable compounds and only initiate the polymerisation of unsaturated organic compounds in the presence of a peroxide component.

It has now been found that the polymerisation of unsaturated organic compounds can be initiated by certain borazanes while obviating the aforementioned difficulties encountered with the known polymerisation catalysts. The polymerisation catalysts employed in the process according to the present invention are of the general formula

(I)

wherein: R represents a straight or branched chain aliphatic hydrocarbon radical containing from 1 to 6 and preferably from 1 to 3 carbon atoms, a cycloaliphatic hydrocarbon radical containing up to 8 carbon atoms or an aralkyl radical wherein said radical is bonded to boron by the aliphatic part of the radical which radicals R may be the same or different.

R' and R", may be the same or different, each represent a hydrogen atom or a straight or branched chain aliphatic hydrocarbon radical containing from 1 to 6 carbon atoms; and R''' represents a hydrogen atom, a straight or branched chain aliphatic hydrocarbon radical containing from 1 to 6 carbon atoms, a cycloaliphatic hydrocarbon radical containing up to 8 carbon atoms, an aryl radical (preferably phenyl radical), an aralkyl radical or an —$NH_2$,

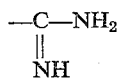

or —$NHC_6H_5$ group.

In the Formula I, $n$ is 1 when R''' is a hydrogen atom, an aliphatic hydrocarbon radical as hereinbefore defined, a cycloalkyl radical or an aryl radical. When R''' is an —$NH_2$,

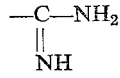

or —$NHC_6H_5$ group however, $n$ can be 1–2.

Borazanes of the general Formula I can be prepared from the corresponding boron trialkyls and suitable amines.

Suitable boron trialkyls for the preparation of borazanes of the general Formula I are, inter alia, boron trimethyl, boron triethyl, boron tri-n-propyl, boron triisopropyl, boron tri-n-hexyl, boron tricyclohexyl, boron dimethylcyclohexyl, boron tribenzyl and boron benzyldimethyl.

Suitable amines for the preparation of borazanes of the general Formula I are trimethylamine, triethylamine, tri-n-propylamine, methyldiethylamine, methyldipropylamine, aniline,toluidine, monomethyl and dimethyl aniline, monoethyl and diethyl aniline and alkyl toluidines. Ammonia, hydrazine, phenylhydrazine, guanidine and analogous compounds can also be used.

Preferred compounds of general Formula I for employment in the process according to the present invention are boron tripropyl-N-methyl-N-phenylborazane, boron tripropyl-N-amidinoborazane $(C_3H_7)_3 \cdot B \cdot NH_2 \cdot C(NH)NH_2$, boron tripropyl-N-aminoborazane, boron tripropyl-(N-phenylamino)-borazane, boron trimethyl-N-dimethyl-N-phenylborazane and boron tricyclohexyl-N-aminoborazane.

The borazanes employed as catalysts in the process according to the present invention are prepared from boron trialkyls resp. boron cycloalkyls etc. These latter compounds are prepared in known manner, for example from $BF_3$ and a Grignard compound or from an N-trialkylborazane and an olefine with subsequent thermal decompositon. The boron trialkyls or aryls are reacted in the absence of air with the stoichiometric quantity or a slight excess of one of the aforementioned basic compounds, for example hydrazine hydrate or an amine such as N-dimethyl aniline. A slight heat of reaction is observed. The temperature of the reaction mixture should preferably not be allowed to exceed room temperature. In some cases it is preferable to carry out the reaction at a temperature below room temperature. The reaction can be carried out in the presence or absence of an inert solvent or with thorough mixing in a two-phase system, consisting for example of the aqueous solution of the basic component and the organically dissolved boron trialkyl component, in which case the organic solvent also acts as a solvent for the reaction product. Suitable solvents are saturated aliphatic hydrocarbons such as n-heptane and cyclohexane, and aromatic and araliphatic hydrocarbons, such as benzene and toluene. The reaction, which starts spontaneously, is complete after a few minutes.

The borazanes can be employed in the process according to the present invention in an aqueous or organic medium and are thus suitable for polymerisation of unsaturated organic compounds in solution, emulsion, suspension (bead) or block as well as for precipitation polymerisation.

The borazanes are preferably employed in an amount of from 0.05 to 1% by weight, based on the weight of the material to be polymerised. It is, however, possible to use smaller or larger quantities, if desired. The molecular weight of the resulting polymer can be regulated by suitable choice of the quantity of borazane employed as polymerisation initiator.

Borazanes of the general Formula I are soluble in practically all organic solvents; for example, as will be shown later, they can be conveniently proportioned and are miscible in compatible manner with monomers which are emulsified or dissolved in solvents, which makes them particulary suitable for employment in precipitation and solution polymerisation processes. Mixtures of borazanes can be employed in the process according to the present invention as polymerisation initiators. The borazanes may also be employed in admixture with other catalysts, such as peroxides, although this is generally unnecessary.

The process according to the present invention is preferably carried out at a temperature of from +5° C. to +20° C., although higher or lower temperatures may be employed, if desired, for example, temperatures of from 0° C. to 100° C. The polymerisation catalyst may be employed in the form of the pure substance or in the form of a solution in an organic solvent, for example the solvent employed in the production of the catalyst.

The following classes of unsaturated organic compounds are, inter alia suitable for polymerisation by the process according to the present invention:

(a) Mono-olefinically unsaturated organic compounds such as acrylic acid and methacrylic acid and their derivatives (e.g. amides, esters and nitrites) and vinyl esters (e.g. vinyl acetate, vinyl propionate and vinyl butyrate);

(b) Mono- and poly-olefinically unsaturated aliphatic, cycloaliphatic and aromatic hydrocarbons (e.g. conjugated dienes such as butadiene, isoprene and dimethyl-2,3-butadiene; styrene; divinyl benzene; styrenes halogenated in the nucleus or in a side chain such as chlorostyrene; styrenes alkylated in the nucleus or in a side chain such as vinyl toluene and methyl styrene; trivinyl benzene and triallyl cyanurate); and (c) halogenated aliphatic hydrocarbons (e.g. chloroprene and vinylidene chloride).

Mixtures of two or more of the aforementioned monomers can also be polymerised as well as mixtures of unsaturated polyesters with other copolymerisable monomers.

Borazanes of the general Formula I are particularly suitable for the precipitation polymerisation of water-soluble monomers from organic solvents which dissolve the monomer but not the polymer, that is to say, for the production of solid polyacrylic or polymethacrylic acid, solid polyacrylamide or polymethacrylamide and for the copolymerisation of acrylamide or methacrylamide with one another or with other monomers which are water-soluble, have limited water solubility or are water-insoluble. If it is desired to obtain water-soluble copolymers, the monomers which have limited water-solubility or which are insoluble in water must be employed in an amount of from 10% to 15% by weight.

A large number of other vinyl and acryl compounds are suitable for precipitation polymerisation by the present process from water or organic solvents with the aid of borazanes of the general Formula I. Examples of such vinyl and acryl compounds are acrylonitrile, methacrylonitrile, acryl and methacryl esters, styrene and vinylidene chloride. Suitable organic solvents are aliphatic, cycloaliphatic and aromatic hydrocarbons and their chlorination products; aliphatic, cycloaliphatic and aromatic ketones; aliphatic alcohols; aliphatic and cyclic ethers; esters and nitriles. Specific examples of suitable solvents are n-heptane, benzene, cyclohexane, carbon tetrachloride, methanol, ethylene glycol, dioxane, acetone, cyclohexanone and dimethylformamide. The choice of the particular solvent depends on the nature of the monomer or monomer mixture as does the ratio of solvent to monomer. The monomer is generally employed in an amount of from 5% to 25% by weight.

The process according to the present invention can be applied to the solution polymerisation or copolymerisation of unsaturated organic compounds in an aqueous or organic medium in a manner known per se. The process can be employed, for example, for the solution polymerisation of acrylic and methacrylic acid in water or ethylene glycol, of acrylamide and methacrylamide in water, of acrylic and methacrylic esters, and styrene in benzene. Other solvents, for example hydrocarbons, such as cyclohexane and toluene and chlorinated hydrocarbons, can also be used, as well as dimethylformamide, in which polyacrylonitrile is soluble. It is surprising that the polymerisation also takes place in alcohol, water and other solvents containing hydroxyl groups. The ratio of monomer to solvent can be varied within very wide limits. It is, however, preferred to employ the monomer in an amount of from 5% to 50% by weight.

Borazanes of the general Formula I are suitable for emulsion, suspension and substance polymerisation of unsaturated organic compounds, especially vinyl and acryl compounds, for example, for the homopolymerisation and copolymerisation of acrylonitrile or methacrylonitrile, acrylic or methacrylic acid esters, styrene, vinylidene chloride and polyolefinically unsaturated monomers, such as conjugated diolefines, for example butadiene, chloroprene and divinylbenzene.

Working up of the reaction product is carried out in the usual manner by filtering off the solvent with suspension polymerisation. Aqueous polymerisation emulsions which have formed can be broken with known auxiliary agents, such as salts (for example sodium chloride, calcium chloride and calcium alum); alcohols (for example methanol, ethanol, propanol and butanol); or acids (for example hydrochloric or sulphuric acid and the solid polymers can be separated out by filtration and washed. Solutions can be used as such or a precipitation of the polymer can be produced with a non-solvent for the polymer.

A particular advantage of the borazanes employed in the process according to the present invention is their capacity of being able to initate polymerisation in solution, emusion, suspension and block or precipitation polymerisation at room temperature and even at lower temperatures without the necessity of having to use other activators, such as peroxides. Unlike boron alkyls, many of the initiators employed in the process according to the present invention have the advantage that they do not spontaneously ignite in air and can conveniently be handled. An additional advantage of the borazanes employed in the present process is that, when working in a nitrogen atmosphere, the polymerisation usually starts immediately without a relatively long induction period, i.e. usually within a few minutes after adding the borazane.

The polymerisation can also be successfully initiated in in the presence of a small quantity of a stabiliser, for example hydroquinone, phenthiazine or tert.-butyl pyrocatechol.

The polymers produced by the process according to the present invention can be used in known manner as elastomers, as starting materials for the production of fibres, for films and foils, shaped elements, plastic compositions, textile auxiliaries and thickening agents, depending on the nature of the monomers employed in their production.

*Example 1*

150 g. of acrylamide were dissolved in 800 g. of distilled dioxane. 50 g. of water and 0.3 g. of a borazane (prepared from 2 parts of boron tripropyl and 1 part of guanidine) was added to the resulting solution in a nitrogen atmosphere at 22° C. Polymerisation started immediately and was complete after 7 hours. During this time reactivation was carried out once with a further 0.3 g. of the borazane. During the experiment, the temperature in the reaction vessel rose to a maximum of 68° C. Polyacrylamide was obtained during the reaction as a granular product. The polyacrylamide was completely soluble in water and had a K-value of 88 according to Fikentscher (Cellulosechemie 13 (1932), 58). Said polymer may be employed as textile auxiliary.

*Example 2*

150 g. of acrylic acid were dissolved in 850 g. of n-heptane in a 2-litre stirrer-type vessel and under a nitrogen atmosphere and activated at 20° C. with 0.3 g. of a borazane prepared from 2 parts of boron tripropyl and 1 part of hydrazine. Reactivation was effected 6 times over a period of 13 hours using 0.3 g. of the borazane on each occasion. The polymerisation was complete after 13 hours. The internal temperature of the reaction vessel rose to a maximum of 30° C. Polyacrylic acid was obtained during the reaction as a fine powder, which was completely soluble in water and had a K-value of 81.

*Example 3*

43 g. of acrylamide and 57 g. of methacrylamide-methylol-methylether were dissolved in 900 g. of ethylene glycol in a 2-litre stirrer-type vessel under a nitrogen atmosphere. 0.2 g. of boron tripropyl-N-methyl-N-phenyl borazane was added to the resulting solution at 24° C. Reactivation was carried out seven times at hourly intervals using 0.2 g. of the borazane on each occasion. Polymerisation was complete after 7 hours. The copolymer formed during the reaction as a white precipitate and the internal temperature in the reaction vessel rose during the experiment to a maximum of 30° C. The result was a copolymer in powder form and having a K-value of 42. The copolymer was completely soluble in water.

*Example 4*

50 g. of acrylamide were dissolved in 450 g. of water in a 1-litre stirrer-type vessel under a nitrogen atmosphere. 0.2 g. of borazane (prepared by adding 2 parts of boron tripropyl to 1 part of hydrazine in absence of solvents) was added to the resulting solution at 20° C. The temperature in the reaction vessel rose within a few minutes to 29° C. and the solution became highly viscous. The solution was diluted with 500 g. of water after completion of the reaction. A highly viscous 5% aqueous solution of a polyacrylamide having a K-value of 203 was thus obtained.

*Example 5*

65 g. of acrylonitrile, 50 g. of ethyl acrylate and 35 g. of styrene were emulsified in a 1-litre stirrer-type vessel in an aqueous liquor consisting of 6 g. of sodium sulphonate of a mixture of paraffin hydrocarbons containing from 12 to 18 carbon atoms, 0.75 g. of sodium pyrophosphate, 0.9 g. of tert. dodecylmercaptan and 22.5 g. of water. The mixture was then polymerised in emulsion at 22° C. in a nitrogen atmosphere by adding 0.5 g. of a borazane prepared from 2 parts of boron tripropyl and 1 part of hydrazine. Reactivation was carried out six times over a period of 10 hours by adding 0.5 g. of the borazane on each occasion. The conversion was 70%. The internal temperature in the reaction vessel rose during the polymerisation to a maximum of 39° C.

*Example 6*

100 g. of vinylidene chloride and 50 g. of butyl acrylate were emulsified in a 1-litre stirrer-type vessel in an aqueous liquor consisting of 7.5 g. of sodium sulphonate of a mixture of long-chain paraffin hydrocarbons and 220 g. of water. The mixture was then polymerised in emulsion at 22° C. in a nitrogen atmosphere by adding 0.5 g. of a borazane prepared from 2 parts of boron tripropyl and 1 part of hydrazine. Polymerisation started immediately. Reactivation was carried out 7 times over a period of 10 hours using the same quantity of borazane on each occasion. The conversion was 68%. The temperature inside the reaction vessel rose to a maximum of 32° C. during the polymerisation.

*Example 7*

100 g. of methyl methacrylate were suspended in a 1-litre stirrer-type vessel in an aqueous phase consisting of 280 g. of water, 3 g. of sodium polyacrylate, 1.7 g. of secondary sodium phosphate and 0.1 g. of primary sodium phosphate while stirring vigorously. 0.5 g. of a borazane prepared from 2 parts of boron tripropyl and 1 part of hydrazine was added to the resulting suspension at 22° C. under a nitrogen atmosphere. Polymerisation started immediately. Reactivation was carried out 3 times over a period of 6 hours using 0.5 g. of borazane on each occasion. The yield was 78%. The temperature in the reaction vessel rose to a maximum of 34° C. during the polymerisation. The polymethyl methacrylate was obtained in the form of a fine powder, which was suction-filtered, washed with water and dried at 60° C. in vacuo. It had a K-value of 46.

*Example 8*

150 g. of acrylic acid were dissolved in 900 g. of benzene in a 2-litre stirrer-type vessel and under an argon atmosphere and activated at 18° C. with 0.3 g. of a borazane prepared from 2 parts of boron tri-n-hexyl and 1 part of hydrazine. Reactivation was effected 6 times over a period of 13 hours using 0.3 g. of the borazane on each occasion. The polymerisation was complete after 14 hours. The internal temperature of the reaction vessel rose to a maximum of 30° C. Polyacrylic acid was obtained during the reaction as a fine powder, which was completely soluble in water and had a K-value of 111. Aqueous solutions of said polyacrylic acid are useful as thickening agents.

*Example 9*

250 g. of 2-chlorobutadiene and 0.5 g. of n-dodecylmercaptane are emulsified in an aqueous medium of 12 g. of sodium salt of long-chain (i.e. having 12–18 carbon atoms) paraffine sulphonates and 250 g. of water in a 2-litre stirrer-type vessel. Polymerisation in emulsion is activated at 20° C. under nitrogen atmosphere by adding of a borazane prepared from 1 part of boron-tripropyl and 1 part of hydrazine, Reactivation was carried out two times by adding the same quantity of borazane. The conversion after 4 hours was 90%. The internal temperature in the reaction vessel rose during the polymerisation to a maximum of 32° C. Subsequently the latex was freed from unreacted monomer. The polymerisation product obtained in this manner may be used in form of said latex or in form of solid rubber obtainable thereof.

In the foregoing examples the parts are parts by weight unless otherwise indicated.

What we claim is:

1. A process for the polymerization of an ethylenically unsaturated compound polymerizable in the presence of a free-radical-forming catalyst, comprising contacting said compound under polymerization conditions with a borazane initiator having the formula

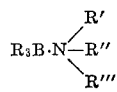

wherein R stands for a member selected from the group consisting of alkyl having 1–6 carbon atoms, cycloalkyl having up to 8 carbon atoms, and aralkyl, said aralkyl being bonded to boron by the alkyl moiety thereof; R' and R'' each represent a member selected from the group consisting of hydrogen and alkyl having 1–6 carbon atoms; and R''' is a member selected from the group consisting of hydrogen, alkyl having 1–6 carbon atoms, cycloalkyl, aryl, aralkyl, $NH_2$—,

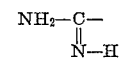

and $C_6H_5NH$—; and recovering the polymer thus produced.

2. The process of claim 1, wherein said ethylenically unsaturated compound is a vinyl monomer.

3. The process of claim 1, wherein said ethylenically unsaturated compound is a conjugated diolefine.

4. The process of claim 1, wherein said ethylenically unsaturated compound is 2-chlorobutadiene.

5. The process of claim 1, wherein said borazane is a boron trialkylborazane.

6. The process of claim 1, wherein said borazane is boron tripropyl-N-methyl-N-phenyl borazane.

7. A process of claim 1, wherein polymerization occurs at a temperature within the range of about 0° to 100° C. in the presence of from about 0.05% to 1% catalyst by weight of the ethylenically unsaturated monomer.

8. A process of claim 1, wherein at least two ethylenically unsaturated compounds copolymerisable in the presence of a free radical forming catalyst, are copolymerized with each other.

References Cited by the Examiner

UNITED STATES PATENTS

| | | | |
|---|---|---|---|
| 2,840,551 | 6/1958 | Field | 260—93.7 |
| 2,973,337 | 2/1961 | Stroh | 260—92.3 |

OTHER REFERENCES

Brown et al., J.A.C.S. vol. 73, pp. 2464–2467, June 1951. Library call No. QD 1 A5.

Coates, Organo-Metallic Compounds, p. 94, John Wiley and Sons, New York (1960), Library Call No. QD 411 C6 (1960).

WILLIAM H. SHORT, *Primary Examiner.*

HAROLD N. BURSTEIN, *Examiner.*